United States Patent [19]

Kress et al.

[11] Patent Number: 5,372,337
[45] Date of Patent: Dec. 13, 1994

[54] UNMANNED AERIAL AIRCRAFT HAVING A SINGLE ENGINE WITH DUAL JET EXHAUSTS

[76] Inventors: Robert W. Kress, 4308 Ulster Landing Rd., Saugerties, N.Y. 12477; Joseph W. Stump, 42 Derby Pl., Smithtown, N.Y. 11787

[21] Appl. No.: 877,210

[22] Filed: May 1, 1992

[51] Int. Cl.[5] .................. B64C 15/12; B64C 29/04; B64D 27/00
[52] U.S. Cl. .................................. 244/52; 244/12.3; 244/12.5; 244/56
[58] Field of Search ............ 244/12.3, 12.4, 12.5, 244/23 B, 23 D, 52, 56, 73 C, 54

[56] References Cited

U.S. PATENT DOCUMENTS

| | | | |
|---|---|---|---|
| 2,774,554 | 12/1956 | Ashwood et al. | 244/23 D |
| 2,885,159 | 5/1959 | Ashwood | 244/23 D |
| 2,886,262 | 5/1959 | Fletcher | 244/23 D |
| 2,912,188 | 11/1959 | Singelmann et al. | 244/23 D |
| 2,933,891 | 4/1960 | Britt | 244/23 D |
| 3,797,527 | 3/1974 | Bain | 244/52 |
| 4,116,405 | 9/1978 | Bacchi et al. | 244/12.4 |
| 4,643,374 | 2/1987 | Friederich | 244/12.4 |
| 4,726,545 | 2/1988 | Kress | 244/12.5 |
| 4,726,545 | 2/1988 | Kress | 244/12.4 |
| 4,809,932 | 3/1989 | Müller | 244/52 |
| 4,969,614 | 11/1990 | Capuani | 244/12.3 |

FOREIGN PATENT DOCUMENTS

| | | | |
|---|---|---|---|
| 2004365 | 11/1969 | France | 244/12.3 |
| 166244 | 1/1965 | U.S.S.R. | 244/56 |

*Primary Examiner*—David A. Bucci
*Assistant Examiner*—Virna Lissi Ansley
*Attorney, Agent, or Firm*—Pollock, VandeSande & Priddy

[57] ABSTRACT

An unmanned aerial vehicle incorporates a single engine with bifurcated exhausts which are coupled to side mounted rotating nozzles through a swivel joint. Jet deflection means are mounted to the end of the rotating nozzles to achieve additional degrees of freedom for the aircraft.

6 Claims, 3 Drawing Sheets

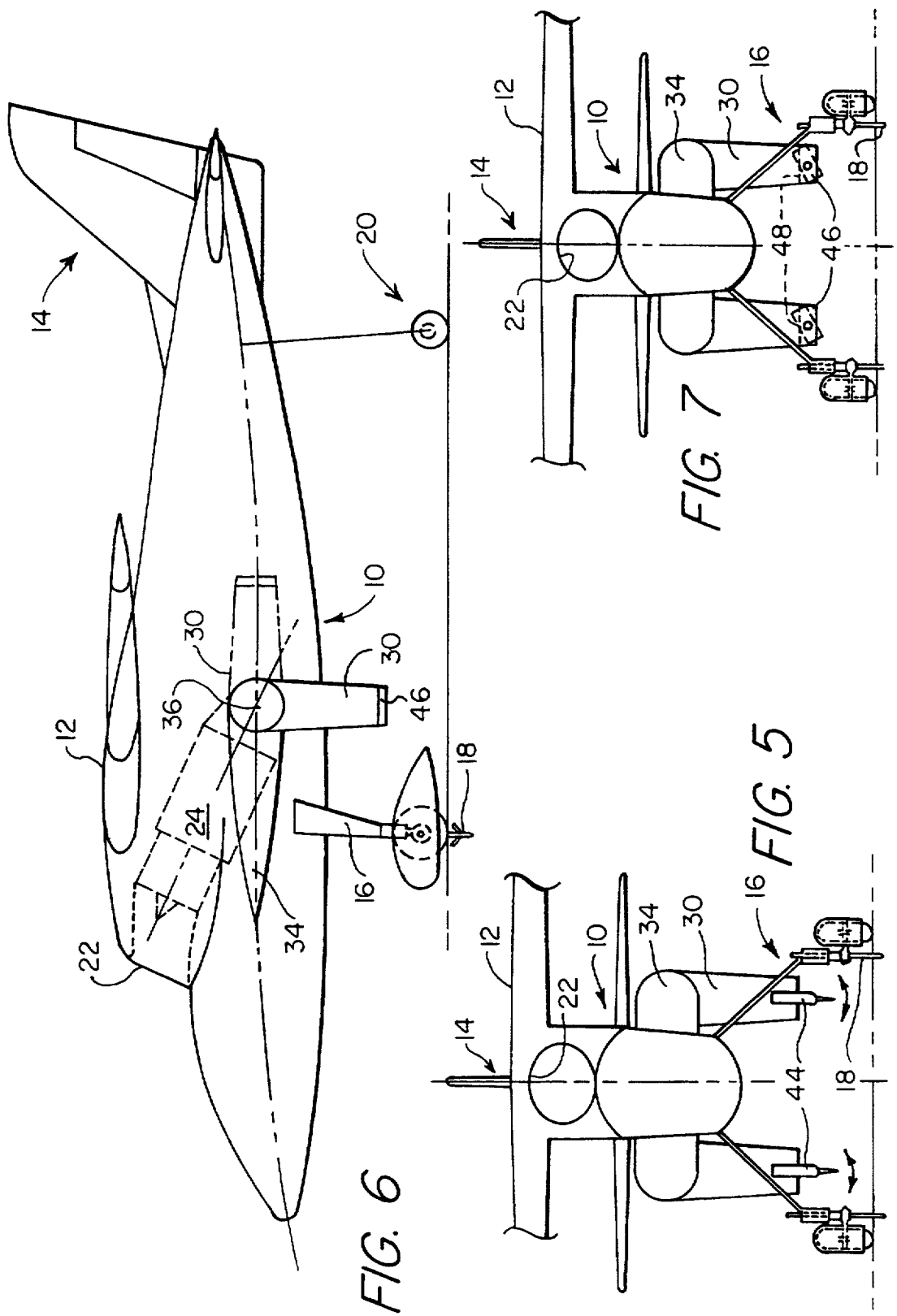

UNMANNED AERIAL AIRCRAFT HAVING A SINGLE ENGINE WITH DUAL JET EXHAUSTS

FIELD OF THE INVENTION

The present invention relates to unmanned aerial vehicles, and more particularly to a jet V/STOL aircraft.

BACKGROUND OF THE INVENTION

An important need of unmanned aerial vehicles (UAVs) exists for the military to perform aerial surveillance over ocean areas beyond line-of-sight from ships not large enough or suitable for manned surveillance flights, or from larger ships because the surveillance task is too hazardous for manned operations. Simple operation from ships on the high seas is thus an implicit requirement. The fundamental flight mode is loiter at at least modest altitudes, although significant range, dash speed, and altitude are needed for some applications.

Conventional takeoff and landing (CTOL) aircraft tend to look like small airplanes and readily provide flight at low power loading (gross weight/installed horsepower) and hence loiter well and cruise well, although at relatively low speeds. They can readily be catapulted for takeoff with good fuel loads but require several hundred feet for landing and still more if loiter is compromised to achieve more speed. There are also specialized recovery techniques such as: parachutes, airborne nets, ship-based nets, and arresting hooks and wires, none of which fully address the complete UAV requirement. CTOL configurations are, however, inexpensive to develop and acquire.

Helicopters can provide good loiter and reasonable altitude capability and can easily be launched. They also capitalize on both manned and drone recovery operational experience on ships. Helicopters inherently have limited speed and range capability, however. They are mechanically very complex compared to CTOL configurations and thus much more expensive.

Highly loaded powered lifting discs (turbo jets or turbo fans) have been flown with the axis nearly vertical and the exhaust pointed downward. In some configurations several turbines have been ganged together and suggest "unidentified flying objects" (UFOs). These configurations tend to be very light, compact, and simple. If one calculates the power loading, it is found that the values are extremely high, hence fuel consumption is also extremely high. These configurations are also very inefficient in cruise flight, hence, both loiter and cruise are very poor compared to the previously discussed alternatives. The exhaust velocities are well above hurricane levels, hence, operational sites require special preparation or must be carefully selected. Since the induced velocities at low flight speeds are high compared to wind gusts, however, gust sensitivity is low.

Tilt rotor configurations couple the low speed advantages of the helicopter with the airplane, and thus provide efficient hover, loiter, cruise, and altitude performance. They are more complex and hence more expensive than helicopters and are dimensionally very large for a given weight. They also suffer from gust sensitivity in low speed like the helicopter because their induced velocities are not much larger than sudden wind changes under gusty conditions.

Tilt turbine configurations tilt powered discs in an airplane type configuration and thus provide both hover and good high speed flight. Gust sensitivity is low, but exhaust velocities are high with the attendant site problems. The British Harrier is the only jet V/STOL to date which has operated extensively from ships. It mounts a simple specific one-of-a-kind turbine engine occupying all the fuselage volume at the aircraft center of gravity.

BRIEF DESCRIPTION OF THE PRESENT INVENTION

The present invention can use generally available engines of various thrust levels and thus provides wide aircraft size options. The present invention utilizes a single engine with dual jet exhausts that are realizable from nozzles secured to the aircraft by swivel couplings. The engine by-pass ratio and hence low speed thrust and fuel flow can be based to favor loiter performance.

Unlike the Harrier in which the engine occupies a large volume at the aircraft center-of-gravity, thus forcing judicious placement of fuel and other disposable items elsewhere to maintain aircraft balance, the present configuration makes this critically located volume available for mission purposes.

The present V/STOL propulsion configuration permits realization of UAVs which are a simpler, more versatile solution to the previously discussed tilt turbine concept. This simplicity facilitates lightweight design.

While Harrier hover and low speed altitude control are provided by compressor bleed air (exhausting at the wing tips and tail) which penalizes thrust performance, the present configuration deflects the main exhaust flow, thus retaining nearly 100 percent engine thrust.

Since the wing is not needed to properly position the roll control jets as with the Harrier, the wing can be folded prior to landing thus increasing clearance with the ship and reducing gust sensitivity.

The inventive configuration is applicable to other airplane configurations such as a canard as well as the conventional arrangement, since the wing and empennage provide no function in hover and low speed flight.

BRIEF DESCRIPTION OF THE FIGURES

The above-mentioned objects and advantages of the present invention will be more clearly understood when considered in conjunction with the accompanying drawings, in which:

FIG. 4 is a side elevational view of a second embodiment of the present invention wherein roll vanes are mounted below rotating nozzles;

FIG. 5 is a front elevational view of the embodiment shown in FIG. 4;

FIG. 6 is a side elevational view of a third embodiment of the present invention wherein a gimbaled nozzle is incorporated at the end of the rotating nozzles;

FIG. 7 is a front elevational view of the embodiment shown in FIG. 6.

DETAILED DESCRIPTION OF THE INVENTION

Figure 1:
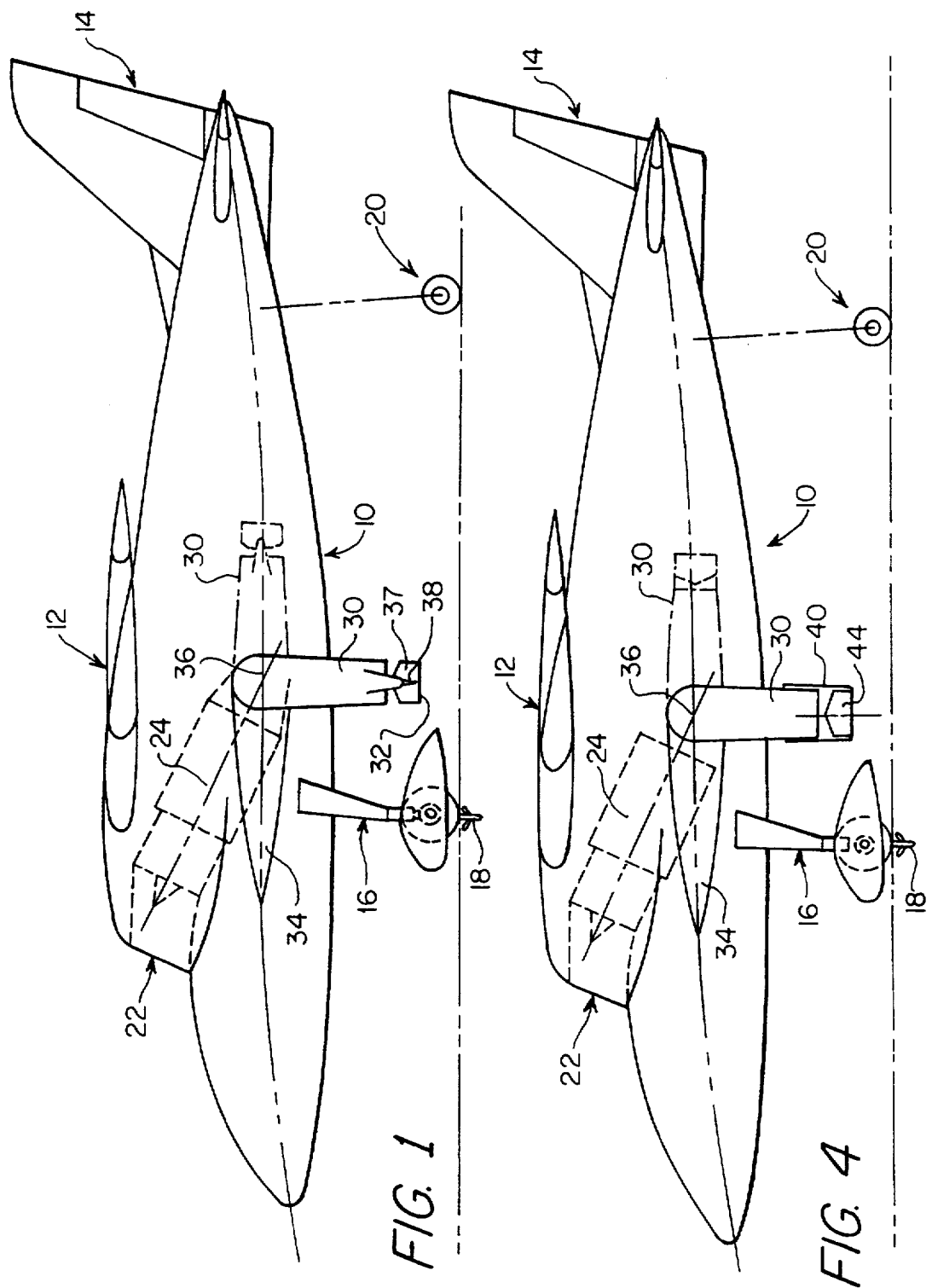
FIG. 1 is a side elevational view of a first embodiment of the present invention wherein pitch and roll vanes are mounted below rotating nozzles.

In FIG. 1 reference numeral 10 generally indicates the fuselage of an unmanned aerial vehicle. It is to be stressed that the shape of the fuselage is not the subject matter of the present invention and may be of any appropriate configuration. The wing assembly 12 is mounted on the top portion of the fuselage well forward of the tail assembly 14. Conventional front landing gear 16 may have retractable barbs 18 which secure the aircraft to a grid located on the deck of a ship. The rear landing gear is generally indicated by reference numeral 20.

Figure 2:
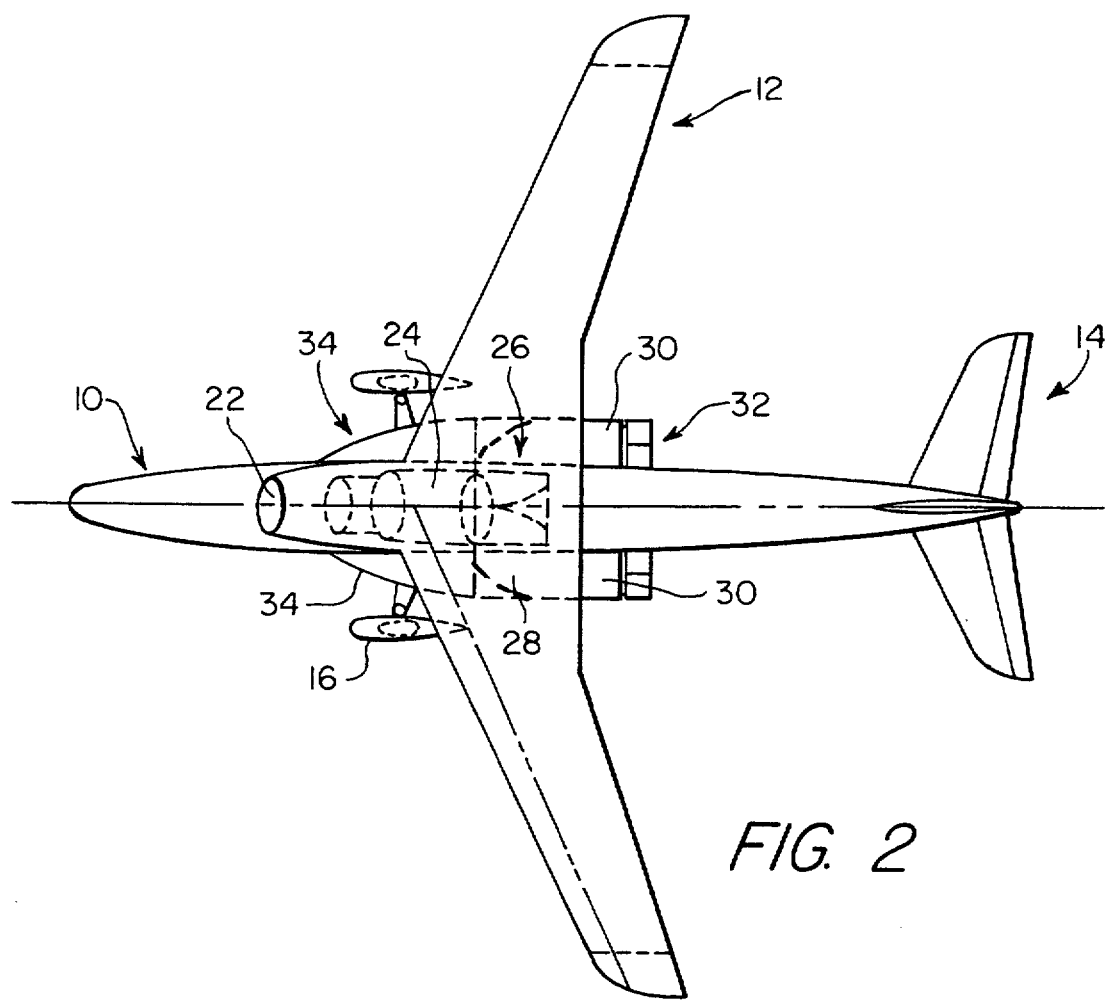
FIG. 2 is a top view of the embodiment shown in FIG. 1.

As indicated in both FIGS. 1 and 2, an inlet 22 exists in a forward portion of the aircraft and admits airflow to a single engine 24 which is mounted at approximately 45° to the center line of the aircraft. The engine is positioned forward of the center of gravity. As shown in FIG. 2, the exhaust end of the engine is bifurcated so that exhaust flow is symmetrically diverted perpendicularly through pipe sections 26 and 28. These pipe sections then undergo an additional turn of 90 degrees through two elongated nozzles 30 which are mounted to the pipe sections 26 and 28 through conventional swivel joints having a center of rotation at 36 (FIG. 1). In FIG. 1 the vertically oriented position of nozzle 30 is appropriate for takeoff and landing while the horizontal position indicated in phantom is appropriate for cruise. Use of the rotating nozzles allows the bifurcated exhaust to be vectored not only in the downward and aft directions, but also in any intermediate direction.

When exhaust flow experiences the two 90 degree turns, the flow exists in an initial high pressure, low velocity state. Thus, turning losses through the 90 degree turns are low. After the second turn the exhaust gas is accelerated in the nozzles 30, converting its potential energy to useful thrust.

Figure 3:
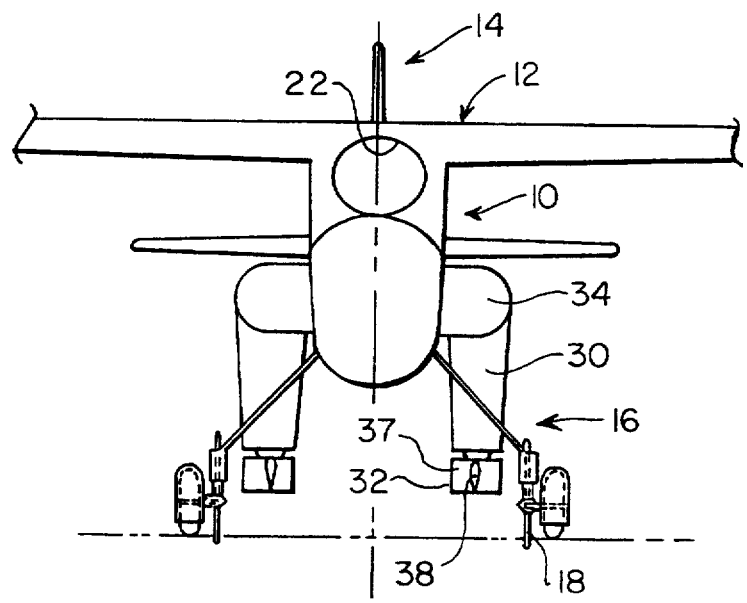
FIG. 3 is a front elevation view of the embodiment shown in FIG. 1.

In the first embodiment of the present invention shown in FIGS. 1-3, this exhaust thrust from each nozzle 30 can be deflected by a vane assembly 32 having vanes 37 and 38, each perpendicular to the other and so oriented that, when the nozzles 30 are pointed downward, fore and aft as well as lateral thrust deflections are produced.

The vane assemblies are far enough below the aircraft center of gravity so that they produce suitable pitch, yaw, and roll moments for hover and low speed control. This is accomplished by utilizing vane controls of a conventional type. Aircraft movement and speed control from vane variations are disclosed in U.S. Pat. Nos. 4,116,405 and 4,726,545, both assigned to the present assignee. However, the present invention is directed to the utilization of a single engine with bifurcated exhausts channeled through rotating nozzles, the ends of the nozzles mounting the vane assemblies.

For transition to and from conventional forward flight, the nozzles are rotated to and from the horizontal and vertical positions. A fairing 34 is located forward of the nozzles 30 and provides suitable streamlining in conventional flight.

At low speeds when the wings do not contribute significant lift, they may be adapted to fold. Such a fold reduces gust response and facilitates stowage. For shipboard operation a landing pad would comprise a metal grid such that sufficient jet exhaust would pass through to avoid re-ingestion in the engine and downwash/fuselage interaction. The barbs 18 ensure positive positioning after landing and before takeoff. The grid-barb combination is not part of the present invention, per se, and is known.

In FIGS. 4-7, two additional embodiments of the invention are indicated; and the same reference numerals refer to identical components in the three disclosed embodiments.

FIGS. 4 and 5 illustrate a second embodiment of the present invention wherein the previously discussed perpendicular vane assemblies are replaced by single vane members 44 at the end of respective nozzles 30. Each of the vanes is enclosed within a shroud 40 located at the outlet of the nozzles 30. In the embodiment shown in FIG. 4, roll is accomplished by the vanes 44 while pitch and yaw control are accomplished by varying the angular orientation of nozzles 30. If both nozzles 30 assume the same relative angular orientation, then only pitch is effected. However, by varying the relative angular orientation, yaw may be controlled.

A third version of the present invention is indicated in FIGS. 6 and 7 wherein the difference resides in the utilization of a gimbaled nozzle located at the end of each rotating nozzle 30. The gimbaled nozzle is indicated in a first horizontal position in FIG. 7 while a second angularly displaced position (FIG. 7) is indicated by reference numeral 48. Actual implementation of gimbaled nozzles is quite conventional and often used in spacecraft.

In the embodiment shown in FIGS. 6 and 7, the gimbaled nozzles 46 will achieve roll control when rotation of these nozzles occurs in a roll axis. Pitch and yaw control are accomplished by the displacement of rotating nozzles 30 as was the case in the previously discussed embodiment of FIGS. 4 and 5.

Other types of exhaust jet deflectors may be incorporated at the end of rotating nozzles 30 in addition to the three variations discussed hereinabove. The central aspect to all variations is the utilization of a single engine with bifurcated exhausts which pass through rotating nozzles mounted to the side of an aircraft.

It should be understood that the invention is not limited to the exact details of construction shown and described herein for obvious modifications will occur to persons skilled in the art.

We claim:

1. In an aircraft, an improved thrust system comprising:

a single engine located forwardly of the aircraft's center of gravity, at a forwardly, upwardly acute angle to a longitudinal axis of the aircraft, and enclosed within a fuselage and having bifurcated exhausts;

first conduit means for directing respective exhaust flows in a first direction transverse of the engine, the flows equaling an entire exhaust output of the engine;

first and second nozzles rotatably mounted to ends of corresponding first conduit means for movement in mutually parallel planes separated by a center line of the aircraft, and which redirect exhaust flows in directions perpendicular to the first conduit means, at individually adjusted angles;

wherein thrust from the engine can be individually vectored by the nozzles to achieve several degrees of freedom primarily during take off and landing.

2. In an unmanned aircraft, an improved thrust system comprising:

a single engine located forwardly of the aircraft's center of gravity, at a forwardly, upwardly acute angle to a longitudinal axis of the aircraft, and enclosed within a fuselage and having bifurcated exhausts;

first conduit means for directing respective exhaust flows in a first direction transverse of the engine, the flows equaling an entire exhaust output of the engine;

first and second nozzles rotatably mounted to ends of corresponding first conduit means for movement in mutually parallel planes separated by a center line of the aircraft, and which redirect exhaust flows in directions perpendicular to the first conduit means, at individually adjusted angles;

and means connected to the ends of the first and second nozzles for deflecting exhaust flowing therethrough and individually vectoring engine thrust to achieve several degrees of freedom primarily during take off and landing.

3. The unmanned aircraft set forth in claim 2 wherein the means connected at each nozzle end comprises an assembly of orthogonal pitch and roll vanes having a central axis angularly rotatable with respect to the central axis of a respective nozzle for achieving pitch and roll control;

differential deflection from the pitch vanes resulting in yaw control.

4. The unmanned aircraft set forth in claim 2 wherein the means connected at each nozzle end comprises a roll vane which pivots generally laterally with respect to a center line of the nozzle to control roll.

5. The unmanned aircraft set forth in claim 2 wherein the means connected at each nozzle end comprises a gimballed nozzle which laterally deflects exhaust flow therethrough to achieve roll control.

6. The unmanned aircraft set forth in claim 2 together with an inlet formed in a forward section of the fuselage for admitting air to an engine intake.

* * * * *